Patented May 21, 1935

2,001,908

UNITED STATES PATENT OFFICE 2,001,908

TREATMENT OF HYDROCARBONS

Vladimir Ipatieff, Chicago, Ill., assignor to Universal Oil Products Company, Chicago, Ill., a corporation of Delaware No Drawing. Application October 26, 1932, Serial No. 639,620

5 Claims. (Cl. 196—10)

This invention relates to the treatment of hydrocarbons and refers more particularly to the treatment of olefinic hydrocarbons which are normally gaseous at ordinary temperatures and pressures.

Olefinic hydrocarbons with which the present invention is concerned occur along with corresponding paraffinic or saturated hydrocarbons in commercial hydrocarbon mixtures such as those encountered in the cracking of petroleum and its derivatives, in gas making processes from the cracking of natural gas, gasoline, etc., and as by-products in various chemical industries. In general they are more chemically active than other classes of hydrocarbons, particularly if they contain more than one double bond or triple bonds between carbon atoms. Even when under mild catalytic influence they exhibit this reactivity in their pronounced tendency to polymerize and form substances of higher molecular weight. In most instances this instability is a disadvantage, particularly in the case of cracked hydrocarbon oil distillates which are of suitable boiling range to permit their use in internal combustion engines, since the polymers which develop on storage are of a gummy character and impart color to the oil.

The present process provides for more effectively utilizing the olefinic constituents of commercial hydrocarbon mixtures particularly those occurring in the gases from oil cracking processes to produce valuable derivatives therefrom and it may also be applied to individual olefins produced by special chemical methods or by fractionation of mixtures.

In one specific embodiment the invention comprises the treatment of normally gaseous olefinic hydrocarbons with sludge sulphuric acid at normal or sub-atmospheric temperatures to controllably produce polymers therefrom which are utilizable as constituents of motor fuel.

To assist in developing the exact character of the invention the following table is introduced, which gives the formulas and boiling ranges of some of the lower molecular weight olefins.

| Compounds | Formula | Boiling Point °C. |
|---|---|---|
| Ethylene | $CH_2=CH_2$ | −105° |
| Propylene | $CH_3CH=CH_2$ | −48° |
| Ethyl ethylene | $CH_3CH_2CH=CH_2$ | −5° |
| Plane-sym.⎱ Dimethyl Axial-sym.⎰ ethylene | $CH_3 \cdot CH=CH \cdot CH_3$ | +1° +2.5° |
| Unsym. dimethyl ethylene | $(CH_3)_2C=CH_2$ | −6° |
| n-Propyl ethylene (α-amylene.) | $CH_3CH_2CH_2CH=CH_2$ | +39° |
| Isopropyl ethylene (α-isoamylene.) | $(CH_3)_2CH \cdot CH=CH_2$ | +21° |
| Sym. methyl ethyl ethylene (β-amylene.) | $CH_3 \cdot CH_2 \cdot CH=CH \cdot CH_3$ | +36° |
| Unsym. methyl ethyl ethylene (γ-amylene.) | $CH_3 \cdot CH_2 {>} C=CH_2$ $CH_3$ | +31° |
| Trimethyl ethylene (β-isoamylene.) | $(CH_3)_2C=CH \cdot CH_3$ | +36° |
| Tetramethyl ethylene | $(CH_3)_2C=C(CH_3)_2$ | +73° |

The present process is particularly directed to the production of dimers from mono-olefins, particularly such olefins whose dimers boil between the approximate range of commercial motor fuel, say, for example, from 100 to 400° F.

The use of sludge sulphuric acid constitutes a special feature of the present invention. Sulphuric acid sludges produced, for example, in the sulphuric acid treatment of miscellaneous petroleum fractions including gasolines (both cracked and straight run), naphthas, kerosenes, lubricants, etc., may be considered as more or less true solutions of organic reaction products in pure sulphuric acid, which, while its strength varies in different sludges, is usually fairly concentrated. Such acids may be considered as sulphuric acid in which organic reaction products formed in sulphuric acid treatments act as diluents or spacing agents for the sulphuric acid instead of water. I have found that by the use of such acid sludges either as produced or after the addition of fresh portions of unused acid to give an acid of the proper strength, that the reactions of polymerization among olefins may be more easily restricted to the formation of the desired dimers and trimers without the formation of any material amounts of high boiling polymers. In using such sludge acids in place of fresh acids the conditions of operation admit of greater variation without danger of undesirable reactions.

There is less tendency to excessive temperature rise which tends to favor the formation of the undesirable tarry polymers and less cooling is necessary. Furthermore, there is less necessity for limiting the time of contact and gas mixtures containing higher percentages of polymerizable olefins may be treated with safety. As a rule, temperatures below 100° F. are most conducive to producing the limited polymerization desired.

In operating upon particular gaseous olefins or mixtures thereof such as are encountered in commercial hydrocarbon gases one mode of operation consists in bubbling the gas mixture through a stationary body of sludge acid of regulated strength using cooling coils or precooled gases to keep down the temperature rise. When operating with more or less pure olefins or gas mixtures of high olefin content, an advantage is sometimes gained in blending the mixture with some inert gas such as hydrogen or nitrogen to assist in controlling the rate of reaction, though, as stated before, this precaution is less necessary when sludge acid is used than when fresh acids are employed. Obviously continuous counterflow treatments may be employed as these are known in the art, and in such cases the gas mixture may be passed upwardly countercurrent to descending streams of acid in towers containing filling or packing material or regularly spaced trays to assist in subdividing the stream of acid. The polymerized olefins will appear as a layer upon the surface of the acid in the case of the first mentioned batch method of treatment, from which they may be removed continuously or intermittently. When employing the counter-current tower operation, liquid will be recovered from above the acid after settling in intermediate accumulators. It is comprised within the scope of the invention to recirculate acid as long as beneficial results are obtained by so doing and, furthermore, the process may be started on sludge produced in the polymerization of gaseous olefins by fresh sulphuric acid.

The process may be aptly illustrated by describing the formation of diamylene from a commercial mixture of amylenes. A vapor mixture comprising approximately 15% of amylenes and 85% of methane is bubbled through a stationary mass of sludge sulphuric acid from cracked naphtha treatment held at a temperature of approximately 90 to 100° F., the pressure being atmospheric or only sufficiently above atmospheric to overcome the pressure of the column of sludge acid used. The boiling range of amylenes used may be from 34 to 38° C., and a 90% yield of diamylenes boiling at approximately 138° F., may be produced, there being also a concurrent production of approximately 5% of triamylenes boiling from 104 to 138° C. The production of this high yield of diamylenes, along with the correspondingly low yield of triamylenes, is in contrast to processes using fresh acid in which the relative yields would be more like 50% of diamylenes and 15% of triamylenes.

The various polymers collect as an upper layer above the acid in the treater, and the dimers produced by fractionation have an anti-knock value slightly above that of iso-octane which is, at present, used as a standard of reference in rating gasolines by means of test engines. The amylenes are thus converted into more stable and useful products, since the anti-knock value of the diamylenes is roughly twice that of the amylenes and they have a greatly lessened tendency toward gum formation.

Similarly dimers of propylene, butylenes, hexylenes and heptylenes may be produced by suitable variation in the conditions of operation. In the case of propylene, and to some extent the butylenes, polymerization may be allowed to proceed to the formation of trimers insofar as the boiling point of the product is not above that of the highest allowable boiling material in the gasoline. Obviously mixtures of olefins may be employed and corresponding mixed products produced, though in such cases the proper conditions of operation for best results will need to be determined by small scale experiments. The reactions of limited polymerization may also be brought about with the olefins dissolved in hydrocarbon or other solvents, and thus the anti-knock value of distillates containing olefins may be improved, as the polymers will then be formed in situ.

As an example of the results obtainable by polymerizing the olefins occurring in a gas from an oil cracking process to produce valuable anti-knock blending fluid, the following case may be cited. In the cracking of a mixture of Mid-Continent residuum and heavy distillates, a gas mixture having the following composition may be produced:

Analysis of gas from cracking

| | Per cent |
|---|---|
| Hydrogen | 8 |
| Methane | 19 |
| Ethane | 14 |
| Ethylene | 9 |
| Propane | 7 |
| Propylene | 23 |
| Butanes | 2 |
| Butylenes | 10 |
| Pentane | 6 |
| Amylenes | 2 |

This gas mixture may be continuously contacted with a sludge acid containing an equivalent of 80% concentrated sulphuric acid by weight in a treating tower at approximately normal atmospheric temperature and pressure and a liquid may be recovered in an amount of 10 gallons per 1000 cubic feet of gas mixture having the following properties:

Properties of recovered liquid

| | |
|---|---|
| Gravity ° A. P. I. | 67 |
| Initial boiling point ° F | 120 |
| 50% point | 190 |
| End boiling point | 370 |
| Octane number | 95 |

After neutralizing and washing this liquid it has a water white color and can be blended directly with the gasoline produced by the cracking process. In the case of a process producing 21 gallons or 50% by volume of gasoline based on charging oil and 500 cubic feet of gas per barrel having the above given composition, it is evident that the overall yield from the cracking process is increased by about 15%, which more than counterbalances the cost of operating and the acid used.

The character of the invention and its commercial value will be readily apparent from the preceding disclosure and the numerical data presented, though its scope is not to be considered as unduly limited by the particular descriptive data or the figures given.

I claim as my invention:

1. A process for the production of liquid products suitable for use as motor fuel and possessing high anti-knock characteristics from gaseous products, which comprises subjecting the gases resulting from a hydrocarbon oil cracking process to the action of preformed sludge acid produced in the treatment of hydrocarbons with sulphuric acid, and recovering the desired resulting liquid product.

2. A process for the production of liquid products suitable for use as motor fuel and possessing high anti-knock characteristics, which comprises subjecting olefinic gases to the action of preformed sludge acid produced in the treatment of hydrocarbons with sulphuric acid, and recovering the desired resulting liquid product.

3. A process for the treatment of gaseous olefin hydrocarbons to produce motor fuel products therefrom, which comprises subjecting the said gaseous olefin hydrocarbons to the action of a sludge-like acidic product derived from the previous treatment of a petroleum derivative with sulphuric acid, and recovering the desired resulting liquid product.

4. A process for the treatment of gaseous olefin hydrocarbons to produce motor fuel products therefrom, which comprises subjecting the said gaseous olefin hydrocarbons to the action of a sludge-like acidic product derived from the previous treatment of a cracked hydrocarbon oil with sulphuric acid, and recovering the desired resulting liquid product.

5. A process for the treatment of gaseous olefin hydrocarbons to produce motor fuel products therefrom, which comprises subjecting the said gaseous olefin hydrocarbons to the action of a sludge-like acidic product derived from the previous treatment of gases resulting from a cracking process with sulphuric acid, and recovering the desired resulting liquid product.

VLADIMIR IPATIEFF.